(12) United States Patent
Kottke et al.

(10) Patent No.: US 7,729,423 B2
(45) Date of Patent: Jun. 1, 2010

(54) FIXED BIT RATE, INTRAFRAME COMPRESSION AND DECOMPRESSION OF VIDEO

(75) Inventors: Dane P. Kottke, Windham, NH (US); Katherine H. Cornog, Newburyport, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 12/215,228

(22) Filed: Jun. 26, 2008

(65) Prior Publication Data
US 2009/0003438 A1    Jan. 1, 2009

Related U.S. Application Data

(63) Continuation of application No. 10/817,217, filed on Apr. 2, 2004, now Pat. No. 7,403,561.

(60) Provisional application No. 60/460,517, filed on Apr. 4, 2003.

(51) Int. Cl.
| H04B 1/66 | (2006.01) |
| H04N 7/12 | (2006.01) |
| H04N 11/02 | (2006.01) |
| H04N 11/04 | (2006.01) |

(52) U.S. Cl. ............................. 375/240.03; 375/240.18; 375/240

(58) Field of Classification Search ............ 375/240.03, 375/240.18
See application file for complete search history.

(56) References Cited

U.S. PATENT DOCUMENTS 668,088 A * 2/1901 Werner ........................ 382/239

(Continued)

FOREIGN PATENT DOCUMENTS

EP     0500077     8/1992

(Continued)

OTHER PUBLICATIONS

Liang-Jin Lin Antonio Ortega, Bit Rate Control Using Piecewise Approximated Rate-Distortion Characteristics, Aug. 1998, IEEE Transaction on Circuits and Systems for Video Technology vol. 8 No. 4.*

(Continued)

*Primary Examiner*—Marsha D Banks Harold
*Assistant Examiner*—Jessica Roberts
(74) *Attorney, Agent, or Firm*—Oliver Strimpel

(57) ABSTRACT

High quality intraframe-only compression of video can be achieved using rate distortion optimization and without resizing or bit depth modification. The compression process involves transforming portions of the image to generate frequency domain coefficients for each portion. A bit rate for each transformed portion using a plurality of scale factors is determined. Distortion for each portion is estimated according to the plurality of scale factors. A scale factor is selected for each portion to minimize the total distortion in the image to achieve a desired bit rate. A quantization matrix is selected according to the desired bit rate. The frequency domain coefficients for each portion are quantized using the selected plurality of quantizers as scaled by the selected scale factor for the portion. The quantized frequency domain coefficients are encoded using a variable length encoding to provide compressed data for each of the defined portions. The compressed data is output for each of the defined portions to provide a compressed bitstream at the desired bit rate.

5 Claims, 9 Drawing Sheets

U.S. PATENT DOCUMENTS

| | | | |
|---|---|---|---|
| 3,769,453 | A | 10/1973 | Bahl et al. |
| 3,984,833 | A | 10/1976 | Van Voorhis |
| 4,044,347 | A | 8/1977 | Van Voorhis |
| 4,092,675 | A | 5/1978 | Saran |
| 4,092,677 | A | 5/1978 | Saran |
| 4,136,363 | A | 1/1979 | Saran |
| 4,302,775 | A | 11/1981 | Wildergren et al. |
| 4,325,085 | A | 4/1982 | Gooch |
| 4,330,833 | A | 5/1982 | Pratt et al. |
| 4,385,363 | A | 5/1983 | Wildergren et al. |
| 4,394,774 | A | 7/1983 | Wildergren et al. |
| 4,410,916 | A | 10/1983 | Pratt et al. |
| 4,476,495 | A | 10/1984 | Fujisawa et al. |
| 4,520,490 | A | 5/1985 | Wei |
| 4,558,302 | A | 12/1985 | Welch |
| 4,558,370 | A | 12/1985 | Mitchell et al. |
| 4,586,027 | A | 4/1986 | Tsukiyama et al. |
| 4,663,325 | A | 5/1987 | Ohtaka et al. |
| 4,698,672 | A | 10/1987 | Chen et al. |
| 4,704,628 | A | 11/1987 | Chen et al. |
| 4,706,265 | A | 11/1987 | Furukawa |
| 4,710,813 | A | 12/1987 | Wallis et al. |
| 4,813,056 | A | 3/1989 | Fedele |
| 4,837,571 | A | 6/1989 | Lutz |
| 4,841,299 | A | 6/1989 | Weaver |
| 4,849,812 | A | 7/1989 | Borgers et al. |
| 4,872,009 | A | 10/1989 | Tsukiyama et al. |
| 4,901,075 | A | 2/1990 | Vogel |
| 4,988,998 | A | 1/1991 | O'Brien |
| 5,027,206 | A | 6/1991 | Vreeswijk et al. |
| 5,049,880 | A | 9/1991 | Stevens |
| 5,072,295 | A | 12/1991 | Murakami et al. |
| 5,128,758 | A | 7/1992 | Azadegan et al. |
| 5,179,442 | A | 1/1993 | Azadegan et al. |
| 5,191,436 | A | 3/1993 | Yonemitsu |
| 5,268,686 | A | 12/1993 | Battail |
| 5,272,478 | A | 12/1993 | Allen |
| 5,291,486 | A | 3/1994 | Koyanagi |
| 5,333,135 | A | 7/1994 | Wendorf |
| 5,426,464 | A | 6/1995 | Casavant et al. |
| 5,428,390 | A | 6/1995 | Cooper et al. |
| 5,461,420 | A | 10/1995 | Yonemitsu et al. |
| 5,481,553 | A | 1/1996 | Suzuki et al. |
| 5,559,557 | A | 9/1996 | Kato |
| 5,579,413 | A | 11/1996 | Bjontegaard |
| 5,663,763 | A | 9/1997 | Yagasaki et al. |
| 5,724,097 | A * | 3/1998 | Hibi et al. ............. 375/240.04 |
| 5,751,359 | A | 5/1998 | Suzuki et al. |
| 5,821,887 | A * | 10/1998 | Zhu ............................ 341/67 |
| 5,959,675 | A * | 9/1999 | Mita et al. ............. 375/240.04 |
| 5,982,437 | A | 11/1999 | Okazaki et al. |
| 6,023,531 | A * | 2/2000 | Peters ........................ 382/232 |
| 6,028,639 | A | 2/2000 | Bhatt et al. |
| 6,198,543 | B1 | 3/2001 | Ryan |
| 6,249,546 | B1 * | 6/2001 | Bist ...................... 375/240.03 |
| 6,256,349 | B1 | 7/2001 | Suzuki et al. |
| 6,438,167 | B1 * | 8/2002 | Shimizu et al. ........ 375/240.03 |
| 6,456,659 | B1 | 9/2002 | Zuccaro et al. |
| 6,484,142 | B1 | 11/2002 | Miyasaka et al. |
| 6,668,088 | B1 * | 12/2003 | Werner et al. ............... 382/239 |
| 6,687,407 | B2 * | 2/2004 | Peters ........................ 382/232 |
| 7,212,681 | B1 | 5/2007 | Chen et al |
| 7,403,561 | B2 | 7/2008 | Kottke et al. |
| 7,433,519 | B2 | 10/2008 | Rynderman |
| 2002/0163966 | A1 * | 11/2002 | Ramaswamy .......... 375/240.03 |
| 2003/0115021 | A1 | 6/2003 | Mates |
| 2004/0062448 | A1 * | 4/2004 | Zeng et al. ................. 382/251 |
| 2009/0080785 | A1 | 3/2009 | Rynderman |

FOREIGN PATENT DOCUMENTS

| | | |
|---|---|---|
| WO | WO 97/16029 | 5/1997 |
| WO | WO98/03550 * | 8/1998 |
| WO | WO 98/03550 * | 8/1998 |
| WO | WO 98/35500 | 8/1998 |
| WO | WO 01/11893 | 2/2001 |
| WO | WO 2004/091221 | 10/2004 |

OTHER PUBLICATIONS

Liang-JinLin Antonio Ortega, Bit Rate Control Using Piecewise Approximated Rate-Distortion Characteristics, Aug. 1998, IEEE Transaction on Circuits and Systems for video Technology vol. 8 No. 4.*

Abrahams, J., "Huffinan Code Trees and Variants", DIMACS, Rutgers University, 1989.

Boliek et al., "Very High Speed Entropy Coding", IEEE International Conference on Image Processing, vol. 3, pp. 625-629, Nov. 1994.

Chen et al., "Scene Adaptive Coder", IEEE Transactions on Communications, vol. COM-32, No. 3, Mar. 1984.

Cormack, G.V. et al., "Data Compression Using Dynamic Markov Modelling", in Computer Journal, vol. 30. No. 6, pp. 541-550, 1987.

Fabris, F., "Variable-Length-to-Variable-Length Source Coding: A Greedy Step-by-Step Algorithm", IEEE Transactions on Information Theory, vol. 38, No. 5, Sep. 1992.

Freeman, G.H., "Divergence and the Construction of Variable-to-Variable-Length Lossless Codes By Source-Word Extensions", IEEE Data Compression Conference, 1993, pp. 79-88.

Gallagher et al., "Optimal Source Codes for Geometrically Distributed Integer Alphabets", IEEE Transactions on Information Theory, Mar. 1975.

Huffman, D., "A Method for the Construction of Minimum-Redundancy Codes", Proceedings of the I.R.E., Sep. 1952.

Jelinek et al., "On Variable-Length-to-Block Coding" IEEE Transactions on Information Theory, vol. IT 19, No. 6, Nov. 1972.

Laemmell et al., "Coded Transmission of Information", Research Report, Polytechnic Institute of Brooklyn, Jan. 1954.

Langdon, G.G., "An Adaptive Run-Length Coding Algorithm", IBM Technical Disclosure Bulletin, vol. 26, No. 7B, Dec. 1983.

Linder et al., "Universality and Rates of Convergence in Lossy Source Coding", Data Compression Conference, Snowbird, Utah, 1993.

Marcus, R., "Discrete Noiseless Coding", MIT MS Thesis, Feb. 1957.

McCray, W.R., Translating A Variable-Length Code, IBM Technical Disclosure Bulletin, vol. 17, No. 11, Apr. 1975, pp. 3328-3329.

Pirsch, P., "Adaptive Intra-Interframe DPCM Coder", Picture Coding Symposium, Jun. 1981.

Pratt, W.K., "Spatial Transform Coding Of Color Images", IEEE Transactions on Communication Technology, vol. COM-19, No. 6, Dec. 1971.

Rosenfeld et al., Digital Picture Processing, $2^{nd}$ Ed., vol. 1, pp. 188-191, Academic Press 1982.

Savari et al., "On the Analysis of Variable-to-Variable Length Codes", Proceedings of the 2002 IEEE International Symposium on Information Theory.

SMPTE 370M-2006, "Standard for Television-Data Structure for DV-Based Audio, Data and Compressed Video", Section 4.4 Variable Length Coding, pp. 1, 53-55. Apr. 18, 2006.

Tescher, A., "A Dual Transform Coding Algorithm", Proceedings Nat. Telecommunication Conference, 1979 IEEE.

Tescher, A., "Rate Adaptive Communication", Proceedings Nat. Telecommunication Conference, 1978 IEEE.

Tunstall, "Synthesis of Noiseless Compression Codes", Doctoral Thesis, Georgia Institute of Technology, Sep. 1967.

Watson, A., "Image Compression Using the Discrete Cosine Transform", Mathematica Journal, 4(1), 1994, pp. 81-84.

Chiang, Tihao, et al, "A New Rate Control Scheme Using Quadratic Rate Distortion Model", IEEE Transactions On Circuits and Systems For Video Technology, vol. 7, No. 1, Feb. 1997, pp. 246-250.

* cited by examiner

FIXED BIT RATE, INTRAFRAME COMPRESSION AND DECOMPRESSION OF VIDEO

CROSS REFERENCE TO RELATED APPLICATIONS

This application claims priority to and the benefit of, under 35 U.S.C. §120, and is a continuation application of application Ser. No. 10/817,217, filed on Apr. 2, 2004, now U.S. Pat. No. 7,403,561, which is a nonprovisional application claiming priority under 35 U.S.C. §119 to provisional Application Ser. No. 60/460,517, filed on Apr. 4, 2003, abandoned; both of which are incorporated herein by reference.

This application claims priority to and the benefit of, under 35 U.S.C. §119, provisional Application Ser. No. 60/460,517.

BACKGROUND

Computer systems that capture, editing and playback motion video typically process motion video data as digital data, representing a sequence of digital images. Such data typically is stored in computer data files on a random access computer readable medium. An image may represent a single frame, i.e., two fields, or a single field of motion video data. Such systems generally allow any particular image in the sequence of still images to be randomly accessed for editing and for playback.

Since digital data representing motion video may consume large amounts of computer memory, particularly for full motion broadcast quality video (e.g., sixty field per second for NTSC and fifty fields per second for PAL), the digital data typically is compressed to reduce storage requirements. There are several kinds of compression for motion video information. One kind of compression is called "intraframe" compression, which involves compressing the data representing each image independently of other images. Commonly-used intraframe compression techniques employ a transformation to the frequency domain from the spatial domain, for example, by using discrete cosine transforms, to generate a set of coefficients in the frequency domain that represent the image or portions of the image. These coefficients generally are quantized, placed in a specified order (commonly called a zig-zag ordering), then entropy encoded. Entropy encoding is a lossless process that typically involves generating code words that represent the coefficients, using a form of Huffman coding scheme. Image quality of compressed images is primarily affected by the loss of information through quantizing.

Some compression techniques involve additional operations that further affect image quality. For example, some compression techniques reduce the size of an image before it is transformed and quantized. Some other compression techniques reduce the bit depth, by rounding, for example, from 10-bits to 8-bits.

More compression can obtained for motion video sequences by using what is commonly called "interframe" compression. Interframe compression involves predicting one image using another. This kind of compression often is used in combination with intraframe compression. For example, a first image may be compressed using intraframe compression, and typically is called a key frame. The subsequent images may be compressed by generating predictive information that, when combined with other image data, results in the desired image. Intraframe compressed images may occur every so often throughout the sequence. For interframe compressed image sequences, the interframe compressed images in the sequence can be accessed and decompressed only with reference to other images in the sequence.

Compression techniques for video also may provide a variable bit rate per image or a fixed bit rate per image. Either type of technique generally uses a desired bit rate in a control loop to adjust parameters of the compression algorithm, typically parameters for quantization, so that the desired bit rate is met. For fixed bit rate compression, the desired bit rate must be met by each compressed image or by the compressed data for each subset of each image. For variable bit rate compression, the desired bit rate is generally the average bit rate (in terms of bits per image) that is sought.

SUMMARY

High quality fixed bit rate, intraframe-only compression of video can be achieved using rate distortion optimization. The compression process involves transforming portions of the image to generate frequency domain coefficients for each portion. A bit rate for each transformed portion using a plurality of scale factors is determined. Distortion for each portion is estimated according to the plurality of scale factors. A scale factor is selected for each portion to minimize the total distortion in the image to achieve a desired bit rate. A quantization matrix is selected according to the desired bit rate. The frequency domain coefficients for each portion are quantized using the selected quantization matrix as scaled by the selected scale factor for the portion. The quantized frequency domain coefficients are encoded using a variable length encoding to provide compressed data for each of the defined portions. The compressed data is output for each of the defined portions to provide a compressed bitstream at the desired bit rate.

Rate-distortion optimization may be performed by obtaining a bit rate for each of a plurality of scale factors, each of which is a power of two. The selected scale factor also may be limited to a scale factor that is a power of two. Portions of the rate-distortion curve that extend beyond the data available also may be estimated. In particular, for any portion of an image and a quantization matrix, there is a scale factor, called the maximum scale factor. Such a scale factor causes all of the quantizers to be such that all of the coefficients are quantized to zero. The maximum scale factor provides the minimum bit rate. Bit rates corresponding to scale factors between the maximum scale factor and another scale factor for which a computed bit rate is available can be estimated by interpolation.

A weighting factor may be used to scale the values in the selected quantization matrix for the bit depth of the image data. Thus, the numerical accuracy of subsequent operations can be controlled for data of multiple bit depths, such as both 8-bit and 10-bit data.

Entropy encoding of the AC coefficients may be performed in the following manner. The range of potential amplitudes for quantized coefficients is split into two parts. The first part is a base range for amplitudes between 1 and a convenient value $A_B$. The second part is an index range for the remaining amplitudes $[A_B+1, \ldots A_{max}]$ where $A_{max}$ is the maximum, quantized coefficient amplitude. Amplitudes in the base range are encoded with a Huffman code word that represents that amplitude. The index range is further divided into a number of segments, each having a range of values corresponding to $A_B$. Amplitudes in the index range are encoded with a Huffman code word that represents the amplitude and an index value that indicates the segment from which they originate. If there is one or more preceding zero valued coefficients, the amplitude is encoded by a Huffman code word, and, if the amplitude is in the index range, followed by an index value, followed by another Huffman code word representing the length of the preceding run of zeros. This encoding may be applicable to forms of data other than quantized coefficient data.

DETAILED DESCRIPTION

Figure 1:
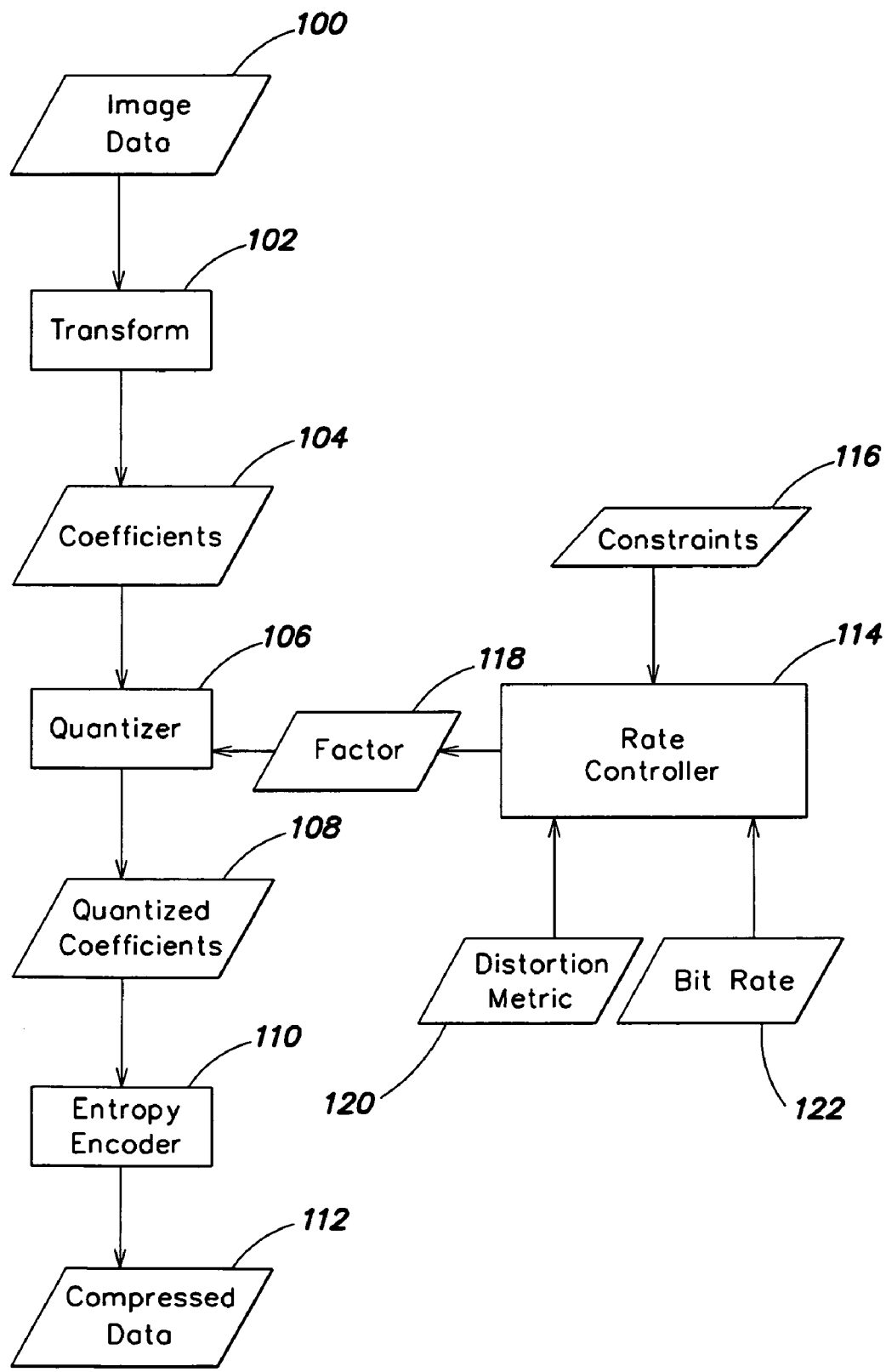
FIG. 1 is a data flow diagram of an example encoder for compression of a sequence of images.

FIG. 1 illustrates a system for compressing image data. Image data 100 is transformed (by transform 102) to produce coefficients 104 for different frequencies. This frequency domain representation of an image may be produced in many ways. For example, the image may be subdivided into blocks of picture elements (pixels). Each block is transformed from its color representation in the spatial domain to a color representation in a frequency domain, typically using a discrete cosine transform (DCT). The result of the transform is a matrix of frequency coefficients, one coefficient for each frequency. A set of such blocks is called a macroblock.

The coefficients are then quantized (by quantizer 106) using a set of quantizers, one quantizer for each frequency, to provide a quantized coefficient 108 for each frequency. The set of quantizers typically is referred to as a quantization table or quantization matrix. The quantization matrices appropriate for a particular bit rate, for example 220 Mbits per frame and 140 Mbits per frame, can be defined experimentally using sample images and a procedure defined in: "RD-OPT: An Efficient Algorithm for Optimizing DCT Quantization Tables," by Viresh Ratnakar and Miron Livny, in 1995 *Data Compression Conference*, pp. 332-341 ("Ratnakar"). Ratnakar teaches how to optimize a quantization table for a single image; however, this procedure may be extended to optimize a quantization table using statistics for multiple example images selected as "typical" images. Such a quantization table can be developed for each of a set of different desired output bit rates.

The quantization table quantizes the frequency data by dividing each coefficient by its corresponding quantizer and rounding. For example, the following formula may be used:

$$\text{round}[S(u,v)/Q(u,v)];$$

where $S(u,v)$ is the value at position $u,v$ in the matrix of frequency coefficients, $Q(u,v)$ is the quantizer at position $u,v$ in the quantization matrix.

The values $Q(u,v)$ in the quantization matrix may be a function of a fixed quantization matrix, a scale factor and a weighting factor. The weighting factor scales the values in the quantization matrix so that they are appropriate for the bit depth of the image data, so that the variability in dynamic ranges is accounted for data of multiple bit depths, such as both 8-bit and 10-bit data.

The quantization also may be performed to provide a variable width "deadzone". The deadzone is the area around zero that is quantized to zero. In the equation above, using rounding, the deadzone has a width of the quantizer value $Q(u,v)$. Noise can be reduced by increasing the deadzone as a function of quantizer value, for example, using the following equations:

The quantized coefficient, c, is defined as:

$$c = \begin{cases} 0 & |x| < (1-k)*Q(u,v) \\ \text{sgn}(x)\left\lfloor \dfrac{|x| + kQ(u,v)}{Q(u,v)} \right\rfloor & |x| \geq (1-k)*Q(u,v) \end{cases}$$

The dequantized value, $\hat{x}$, would be:

$$\hat{x} = \begin{cases} 0 & c = 0 \\ \text{sgn}(c)(|c| - k + \delta)Q(u,v) & c \neq 0 \end{cases}$$

where $\delta$ is typically one-half.

Then the width of the deadzone equals 2 $(1-k)$ $Q(u,v)$

With these equations, if $k=0.5$ and $\delta=0.5$, the quantization/dequantization are conventional with a deadzone of width $Q(u,v)$. For non-zero k the deadzone can be (−1, 0.5) the deadzone is larger. To reduce noise a value of $k \in (-0.5, 0.25)$ might be used to produce a deadzone between 1.5 $Q(u,v)$ and 3.0 $Q(u,v)$.

The scale factor may be controlled by a rate controller 114, described in more detail below. In one embodiment, a set of scale factors that are powers of two, e.g., 1, 2, 4, 8, 16..., may be used.

An entropy encoder 110 encodes the quantized values using entropy encoding to produce code words that are formatted to provide the compressed data 112. Prior to entropy encoding a pre-defined coefficient ordering process is applied to the matrix of quantized coefficients to provide a one-dimensional sequence of coefficients. A set of patterns, called symbols, is identified from the sequence of coefficients. The symbols, in turn, are mapped to code words. The symbols may be defined, for example, using a form of run length encoding. Huffman encoding is generally employed to encode the sequence of symbols to variable length codes. The compressed data 112 includes the entropy encoded data and any other data for each block, macroblock or image that may be used to decode it, such as scale factors. A form of entropy encoding is described in more detail below in connection with FIGS. 3-8.

Compression parameters can be changed to affect both the bit rate and the image quality of decompressed data. In DCT-based image compression, compression parameters that may be changed include the quantizers, either within an image between portions of an image, or from one image to the next. Typically, a portion of an image is a set of DCT blocks called a macroblock. A change to the quantizers affects the compressed bit rate and the image quality upon decompression. An increase in a quantizer value typically decreases the bit rate but also reduces the image quality. Conversely, a decrease in a quantizer value typically increases the bit rate but also improves the image quality. Quantizers may be adapted individually, or the set of quantizers may be scaled uniformly by a scale factor. In one embodiment, the scale factor is adjusted for each macroblock to ensure that each frame has an amount of data that matches a desired fixed bit rate.

A rate controller 114 generally receives the bit rate 122 of the compressed data produced by compressing an image, any constraints 116 on the compression (such as buffer size, bit rate, etc.), and a distortion metric 120. The bit rate and distortion is determined for each macroblock for a number of scale factors in a statistics gathering pass on the image. The rate controller then determines, for each macroblock, an appropriate scale factor 118 to apply to the quantization matrix. The rate controller 114 seeks to minimize the distortion metric 120 over the image according to the constraints 116 by using a technique that is called "rate-distortion optimization," such as described in "Rate-distortion optimized mode selection for very low bit rate video coding and the emerging H.263 standard," by T. Wiegard, M. Lightstone, D. Mukherjee, T. G. Campbell, and S. K. Mitra, in *IEEE Trans. Circuits Syst. Video Tech.*, Vol. 6, No. 2, pp. 182-190, April 1996, and in "Optimal bit allocation under multiple rate constraints," by Antonio Ortega, in *Proc. of the Data Compression Conference* (DCC 1996), April 1996. In particular, the total distortion over all macroblocks in the image is optimized over the image to meet a desired bit rate and thus select a scale factor for each macroblock.

There are several ways to compute a distortion metric. For example, but not limited to this example, the distortion metric 120 ($d$) may be estimated by the square of the scale factor (q), i.e., $d=q^2$. Thus, the distortion metric is known for each scale factor without analyzing the compressed image data.

The bit rate and distortion metric corresponding to a scale factor for which quantization is not performed may be estimated by interpolating measured rate and distortion values obtained from other scale factors. Such a technique is described in "Bit-rate control using piecewise approximated rate-distortion characteristics," by L-J. Lin and A. Ortega, in *IEEE Trans. Circuits Syst. Video Tech.*, Vol. 8, No. 4, pp. 446-459, August 1998, and in "Cubic Spline Approximation of Rate and Distortion Functions for MPEG Video," by L-J. Lin, A. Ortega and C.-C. Jay Kuo, in *Proceedings of IST/SPIE, Digital Video Compression Algorithms and Technologies* 1996, vol. 2668, pp. 169-180, and in "Video Bit-Rate Control with Spline Approximated Rate-Distortion Characteristics," by Liang-Jin Lin, PhD Thesis, University of Southern California, 1997. For example, bit rates may be computed for two scale factors, one small and one large such as 2 and 128. Interpolation between these two points may be used to obtain a suitable scale factor with a corresponding desired bit rate. If the resulting compressed image data exceeds the desired bit rate, the image data can be compressed again using a different scale factor.

Portions of the rate-distortion curve that extend beyond the data available also may be estimated. In particular, for any portion of an image and a quantization matrix, there is a scale factor, called the maximum scale factor. Such a scale factor causes all of the quantizers to be such that all of the coefficients are quantized to zero. The maximum scale factor provides the minimum bit rate. Bit rates corresponding to scale factors between the maximum scale factor and a scale factor for which an actual bit rate is available can be estimated by interpolation, such as linear interpolation.

A more specific example of a rate controller is described in more detail below in connection with FIG. 10.

Figure 2:
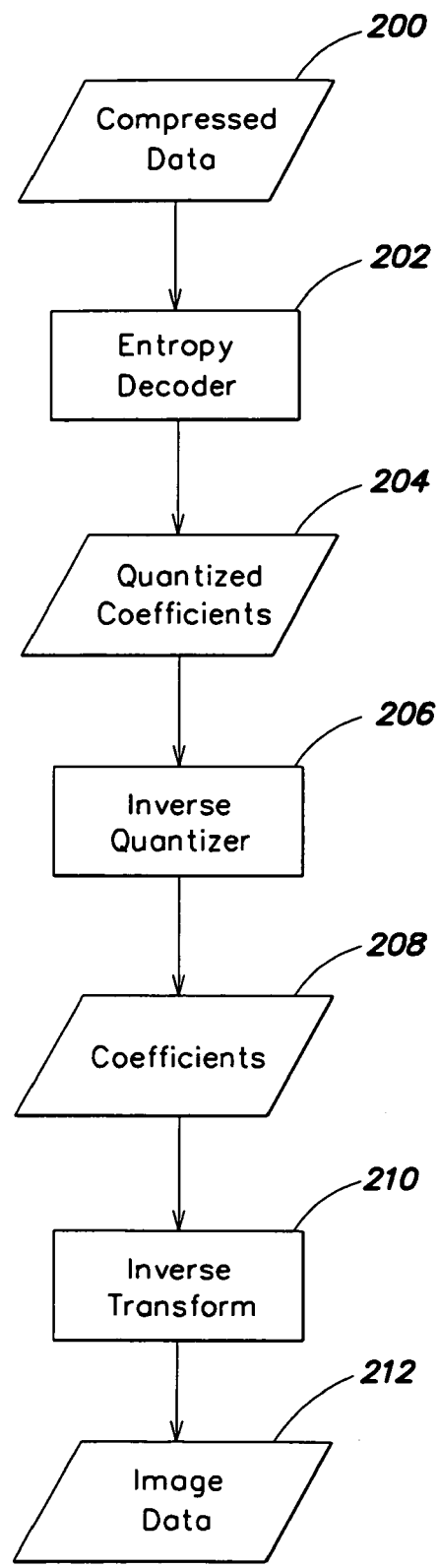
FIG. 2 is a data flow diagram of an example decoder for decompression of a sequence of images.

Referring now to FIG. 2, a system for decompressing or decoding image data will now be described. Compressed image data 200 is received and code words are processed by an entropy decoder 202. The entropy decoder performs the inverse of the entropy encoding performed in FIG. 1. An example entropy decoder is described in more detail below. The entropy decoder 202 produces the quantized coefficient data 204. An inverse quantizer 206 reverses the quantization to produce coefficients 208. An inverse transform 210 is performed on the coefficients 208 to produce the image data 212.

Figure 9:
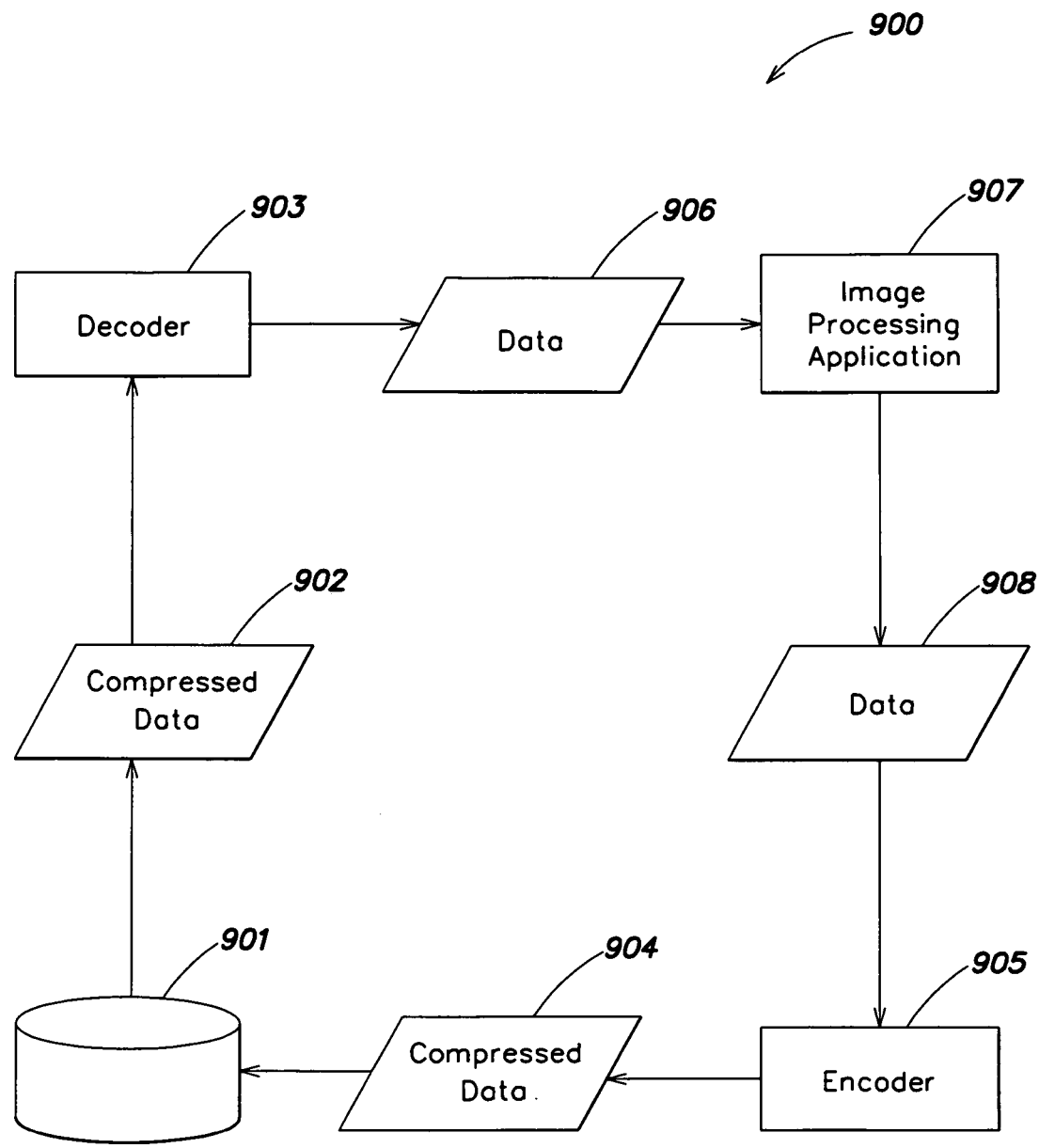
FIG. 9 is a dataflow diagram of an example image processing system that uses an encoder and decoder such as in FIGS. 1 and 2.

FIG. 9 is data flow diagram of an example image processing system that such an encoder and decoder. The image processing system 900 includes data storage 901 including a computer readable medium that stores the compressed image data. The compressed image data may be stored, for example, in a data file or may be referenced by metadata in a file format such as MXF or AAF. Such compressed image data also may be stored in memory, such as a cache. This compressed image data also may be used for transmission of data in which case 901 represents a transmission medium over which the compressed image data is transmitted as computer readable signals. Data 902 including the compressed image data is read and decompressed by a decoder 903. The decoder corresponds to FIG. 2. Data including the compressed image data, shown at 904, is compressed and written by an encoder 905. The decoder 903 may read one or more images from the compressed image data. The decoder 903 decompresses the read data and provides the decompressed data 906 to an image processing application 907.

The image processing application 907 performs operations on the image data to produce uncompressed image data 908. For example, such image processing operations may include, but are not limited to, operations for combining images, such as compositing, blending, and keying, or operations within an image, such as resizing, filtering, and color correction, or operations between two images, such as motion estimation. The image processing application also may be an application that captures and/or creates digital image data, without using any input image data 906. The image processing application also may manipulate metadata about the image data, for example to define a sequence of scenes of motion video information. The image processing application also may playback image data in one or more formats, without providing any output data 908.

Although FIG. 9 shows only one image processing application, there may be multiple image processing operations that may operate in parallel on the data or may operate as a sequence of operations. There are a variety of ways in which an image processing operation may process image data, and the invention is not limited thereby. As an example, the decoder and/or the image processing application and/or the encoder may be part of a larger application for editing video information. As another example, the encoder and/or image processing application and/or the decoder may "plug-in" to an editing application that permits access to image data in memory through an application programming interface (API). The encoder and decoder may be implemented in hardware that is accessed by an image processing application.

Entropy encoding and decoding will now be described in connection with FIGS. 3-8. The DC coefficients may be encoded and decoded in a number of ways, for example, but not limited to a method used in the MPEG-2 standard. The entropy encoding of the AC coefficients uses the range of potential non-zero amplitudes for quantized coefficients and splits this range into two parts: $[1, \ldots, A_B]$ and $[A_B+1 \ldots, A_{max}]$. The first part is a base range for amplitudes between 1 and a convenient amplitude, for example 64. The second part is an index range for the amplitudes greater than $A_B$ up to an including the maximum amplitude $A_{max}$, for example 65 to 4096. Amplitudes in the base range are encoded with a Huffman code word that represents that amplitude. The index range is further divided into a number of segments, each having a range of values corresponding to $A_B$. Amplitudes in the index range are encoded with a Huffman code word that represents the amplitude and an index value that indicates the segment from which they originate. If there is one or more preceding zero valued coefficients, the amplitude is encoded by a Huffman code word, and, if the amplitude is in the index range, followed by an index value, followed by another Huffman code word representing the length of the preceding run of zeros. The longest run of zeros is the number of coefficients to be encoded minus one.

Therefore, for the AC coefficients, there are six types of symbol sets: four for amplitude symbols, one for run lengths, and one for end of block, as follows below. In this example, $A_B=64$ and $A_{MAX}=4096$, but this can be easily generalized to other partitionings of the quantized coefficient amplitude range.

1. $A^{nrb} = \{A_1^{nrb}, A_2^{nrb}, \ldots, A_{64}^{nrb}\}$: Non-zero amplitude coefficients in the base range, with no preceding run of zero valued coefficients. The amplitudes vary from $A_1^{nrb}=1$ to $A_{64}^{nrb}=64$.

2. $A^{wrb} = \{A_1^{wrb}, A_2^{wrb}, \ldots, A_{64}^{wrb}\}$: Non-zero amplitude coefficients in the base range, with preceding run of zero valued coefficients. The amplitudes vary from $A_1^{wrb}=1$ to $A_{64}^{wrb}=64$.

3. $A^{nri} = \{A_1^{nri}, A_2^{nri}, \ldots, A_{64}^{nri}\}$: Non-zero amplitude coefficients in the index range, with no preceding run of zero valued coefficients. The amplitudes vary from 65 to 4096.

4. $A^{wri} = \{A_1^{wri}, A_2^{wri}, \ldots A_{64}^{wri}\}$ Non-zero amplitude coefficients in the index range, with preceding run of zero valued coefficients. The amplitudes vary from 65 to 4096.

5. $R = \{R_1, R_2, \ldots, R_{max}\}$: a run of 1 or more zero valued coefficients. $R_1=1$ and $R_{max}=62$.

6. $E = \{EOB\}$: the end of block symbol.

Figure 3:
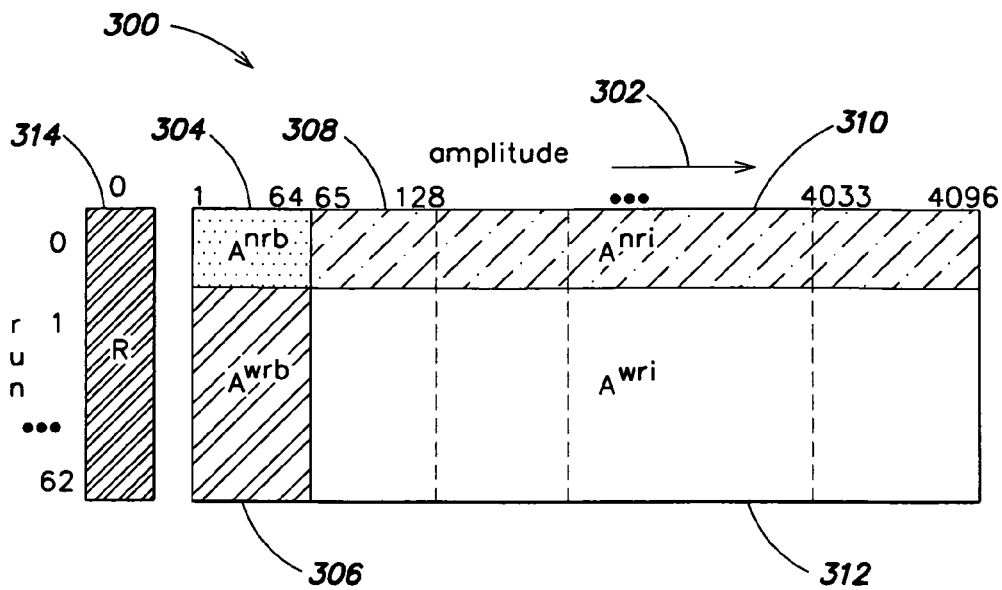
FIG. 3 is a table representing how coefficient values may be entropy encoded.

FIG. 3 shows how a zero run length and amplitude coefficients are mapped to the sets $A^{nrb}$, $A^{nri}$, $A^{wrb}$, $A^{wri}$ and R. The map 300 of FIG. 3 indicates that for amplitudes (represented along axis 302), 1 to 64, there are two possible symbol sets $A^{nrb}$ (304), if the preceding run of zeros is zero, and $A^{wrb}$ (306), if the preceding run of zeros is nonzero. For amplitudes 65 to 4096, each range of 64 values, e.g., 308, has a unique index i, and two symbol sets $A^{nri}$ (310), if the preceding run of zeros is zero, and $A^{wri}$ (312), if the preceding run of zeros is nonzero. A code word R is provided for each run length, as indicated at 314; however $A^{wrb}$ and $A^{wri}$ are not affected by the actual length of the run of zeros.

If the amplitude of a coefficient maps to one of the index ranges, either $A^{nri}$ 310 or $A^{wri}$ 312, it is encoded by a variable length code word and an index value. The index value, P, is computed from the amplitude A by:

$$P = ((A-1) >> 6), \quad 65 \leq A \leq 4096.$$

The value used to determine the variable length code word, V, is computed according to:

$$\hat{A} = (P << 6) \quad 1 \leq \hat{A} \leq 64; \quad V = VLCLUT(\hat{A}).$$

Using these techniques, a set of Huffman code words is generated for the symbols in the five sets of $A^{nrb}, A^{nri}, A^{wrb}, A^{wri}$ E, which results in a set of amplitude code words $V^A = \{V^{nrb}, V^{nri}, V^{wrb}, V^{wri}, V^E\}$. There are $4*64+1=129$ code words in $V^A$. Another set of Huffman code words is generated for the 62 symbols in R, which results in a set of zero-run code words $V^R$. The set of code words and how they map to amplitude values or run length values can be defined using statistics from sample data according to Huffman coding principles.

Figure 4:
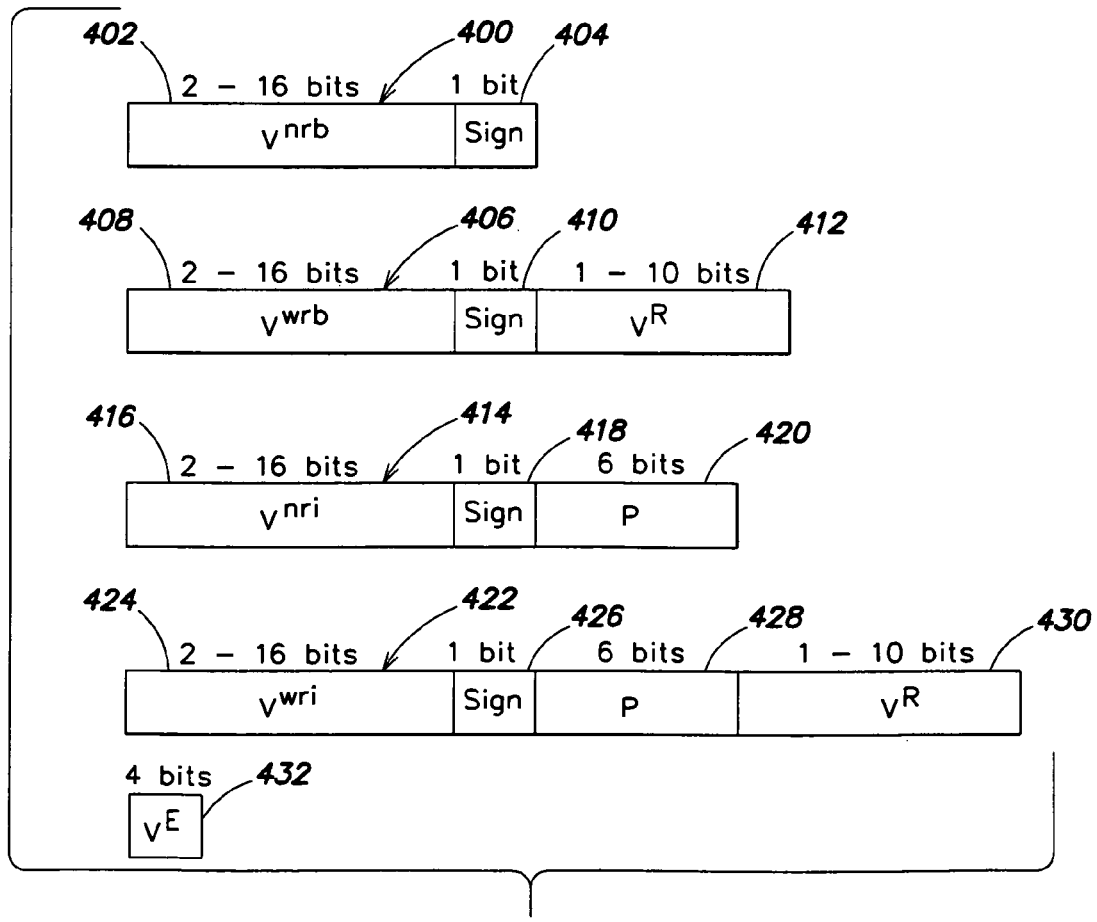
FIG. 4 is a diagram of an example format of code words for entropy encoding.

The format of such code words will now be described in connection with FIG. 4. If the amplitude of a coefficient maps to the symbol set $A^{nrb}$ 304, a single code word is inserted into the encoded symbol bitstream. The format for this code word is shown in the top of FIG. 4 at 400, and includes the code word $V^{nrb}$ 402 and a sign bit 404. If the amplitude of a coefficient is in the range of $[1, \ldots, A_B]$ but is preceded by a run of zeros, it maps to the symbol set $A^{wrb}$. In this case, two code words 406 are inserted into the encoded symbol bitstream: one for the code word $V^{wrb}$ 408, with a sign bit 410, and the second for the number representing the preceding run of zeros $V^R$ 412. If a coefficient has no preceding run of zeros and its amplitude is in the range of $[A_B+1, \ldots, A_{MAX}]$, it maps to symbol set $A^{nri}$; a single code word 414 is inserted in the encoded symbol bitstream that includes the code word $V^{nri}$ 416, a sign bit 418 and a 6-bit index value P 420. If the amplitude of a coefficient is in the index range of $[A_B+1, \ldots, A_{MAX}]$ and is preceded by a run of zeros, it maps to symbol set $A^{wri}$. In this case, two code words 422 are inserted into the encoded symbol bitstream. These code words include a code word $V^{wri}$ 424, with sign bit 426 and a 6-bit index P 428, to represent the amplitude, and a code word $V^R$ 430 to represent the number representing the preceding run of zeros. Finally, the end of block code word 432 is a single code word, for example a 4-bit symbol, is inserted into the encoded bit-stream at the end of a block.

Figure 5:
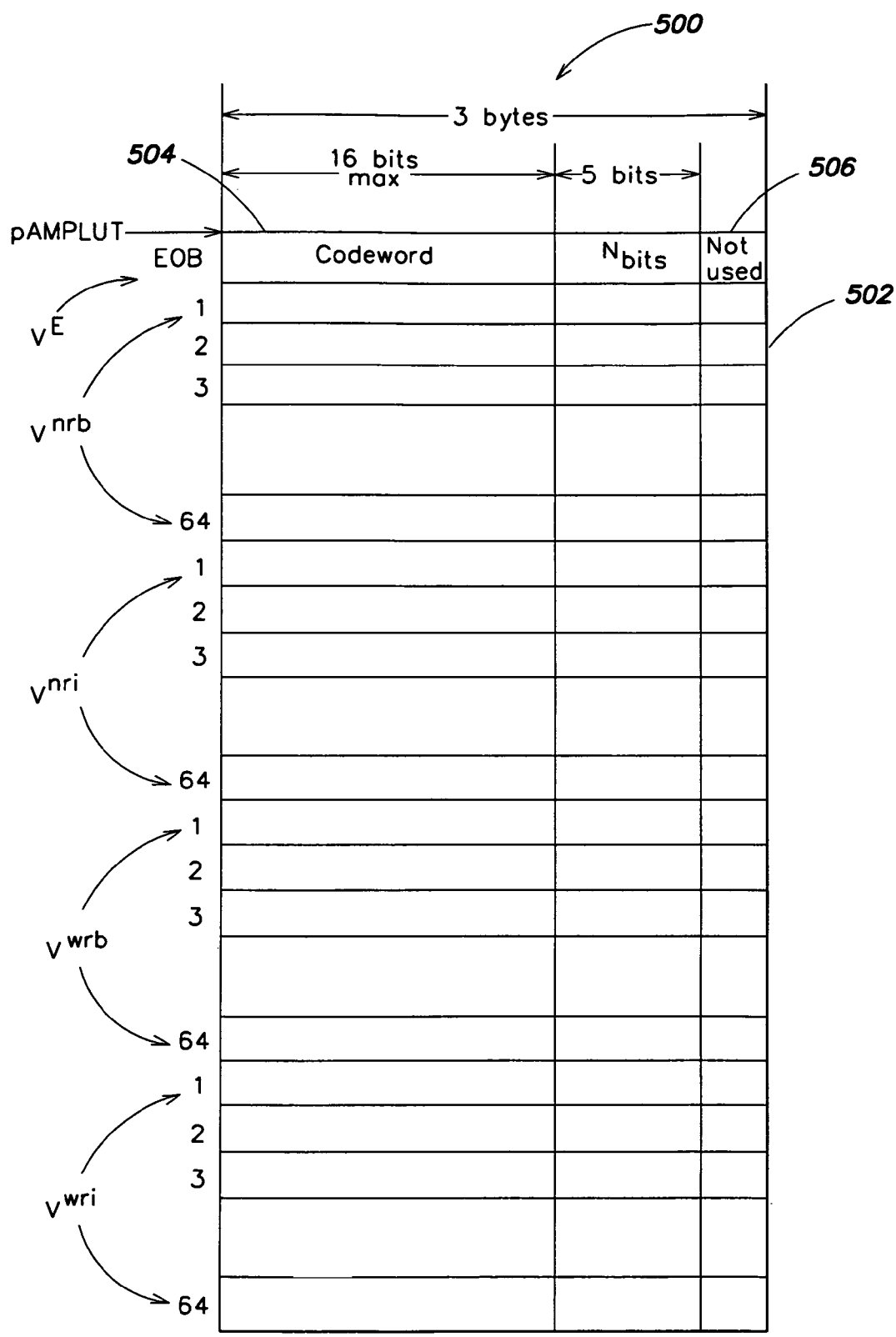
FIG. 5 is a diagram of an example lookup table for converting a coefficient to a code word.
Figure 6:
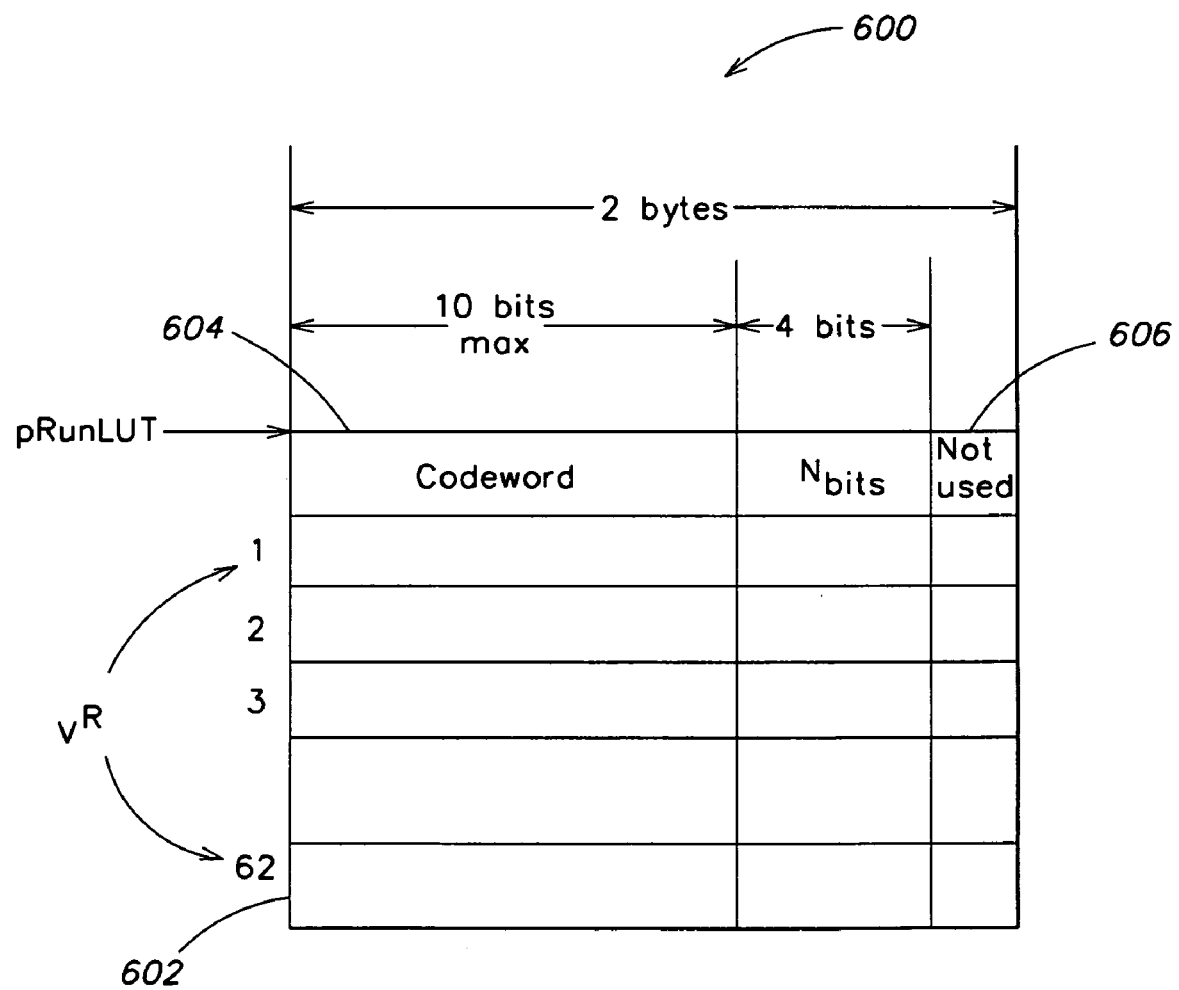
FIG. 6 is a diagram of an example lookup table for converting a run length value to a code word.

Such variable length encoding may be performed using two lookup tables, examples of which are shown in FIGS. 5 and 6. The format for the amplitude symbols in the set $V^A$ is shown in FIG. 5. The format for the run-length symbols in the set $V^R$ is shown in FIG. 6.

Each entry, e.g., 502, in the amplitude table 500 uses sixteen bits for the code word 504 and five bits that represent the length 506 of the code word. The maximum storage requirement for one entry, e.g., 502, is twenty-one bits. Thus, each entry can be stored in three successive bytes. In some instances, it may be useful to store the value as a 32-bit word. The total number of bytes required for the amplitude encoding table is $$129 * 3 \frac{\text{bytes}}{\text{entry}} = 387 \text{ bytes}.$$

Given an amplitude, it can be converted to a value between 1 and 64 and an indication of whether it is preceded by a run, and an indication of whether it is in the base range or the index range, and the index value P. This information is applied to the lookup table 500 to retrieve the code word $V^{nrb}, V^{nri}, V^{wrb}$, or $V^{wri}$, which can be combined with a sign bit, index value P, and, if appropriate, the subsequent code word $V^R$ for the run length.

The run-length table 600 has entries, e.g., 602, that require a maximum of 14 bits, including 10 bits for the code word 604 and 4 bits for the length 606 of the code word, which can be stored in two bytes. There are a total of 62 entries, which means that the table requires $$62 \text{ entries} * 2 \frac{\text{bytes}}{\text{entry}} = 124 \text{ bytes}.$$

Given a run length, the code word corresponding to that run length is simply retrieved from the table.

Figure 7:
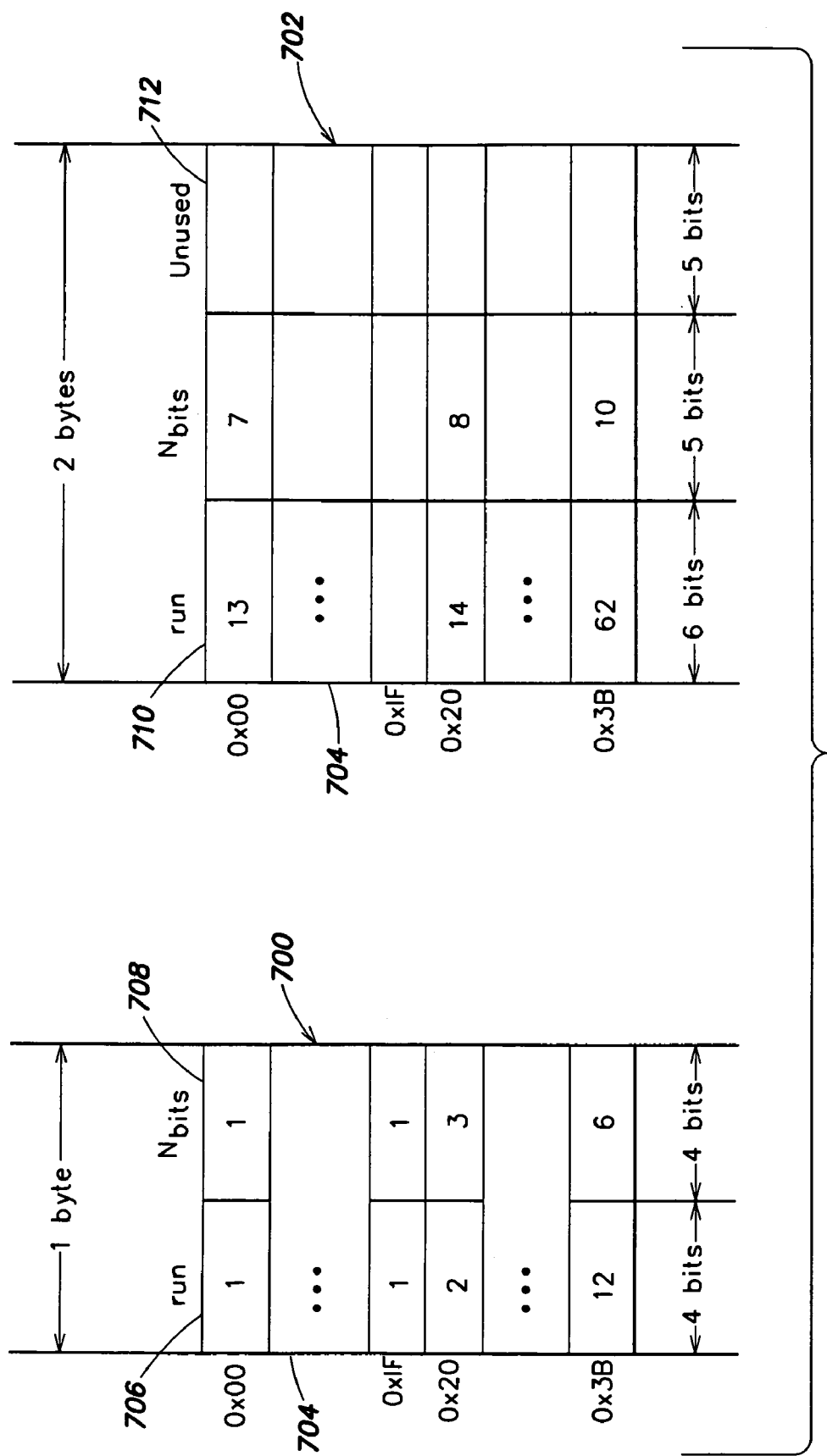
FIG. 7 is a diagram of an example lookup table for converting a code word to a coefficient value.
Figure 8:
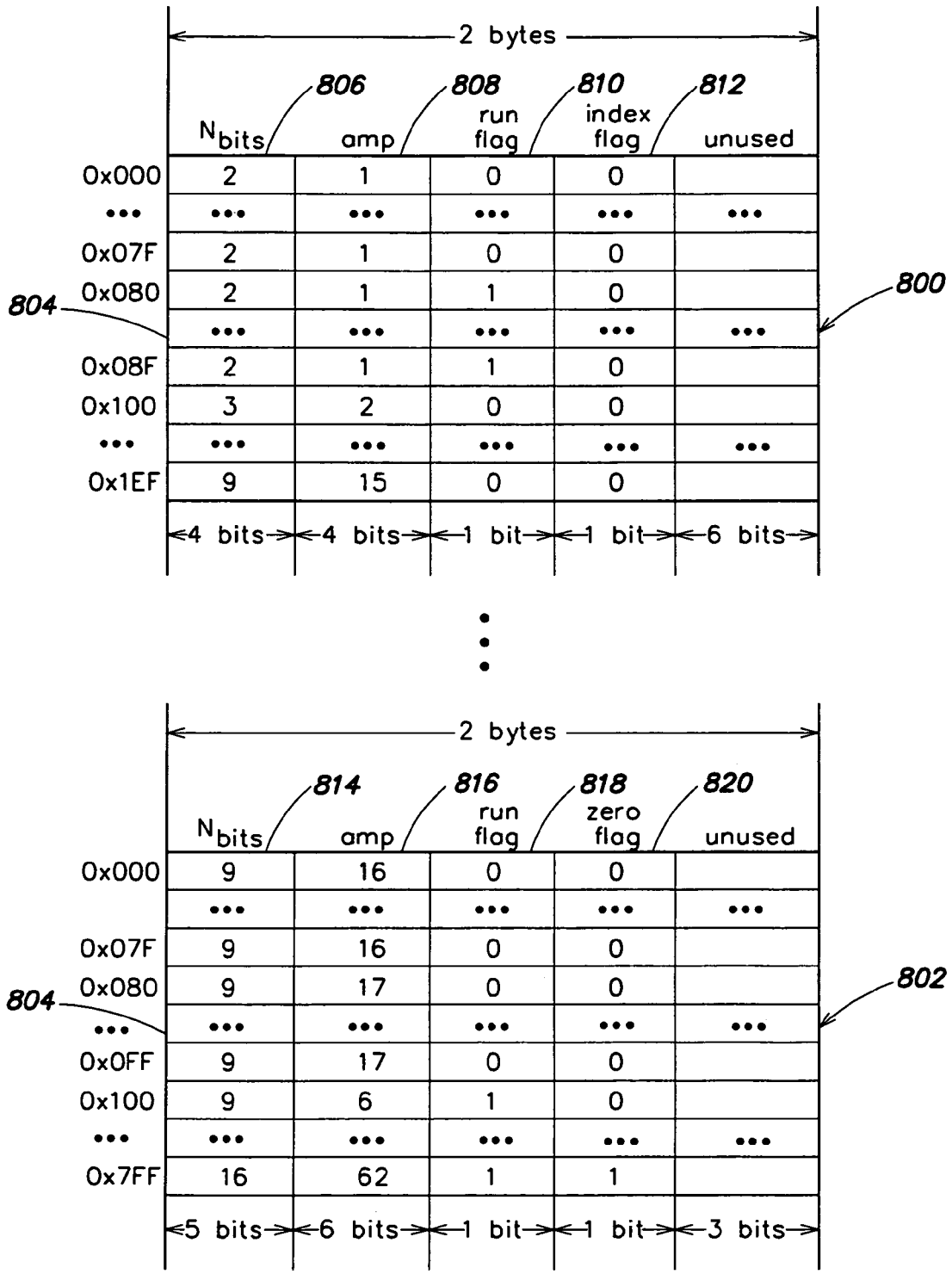
FIG. 8 is a diagram of an example lookup table for converting a code word to a run length value.

An example format for decoding tables is shown in FIG. 7-8. To save memory each decoding table, one for amplitude code words and the other for run length code words, may be divided into two tables. Due to the nature of Huffman codes, each code word can be uniquely located in a bitstream. For each code word, it is applied to the appropriate decoding table.

For run length values, either table 700 or 702 receive as an input 704 a run length code word, and provide as an output the corresponding value. The corresponding value includes a number 706 or 710 representing the length of the run and a length 708 or 712 representing the length in bits of the number 706 or 710.

For amplitude values, either table 800 or 802 receive as an input 804 the amplitude code, and provide as an output the corresponding values including a number 806 or 814 representing the length in bits of the value to be output, a number 808 or 816 representing the amplitude, a run flag 810 or 818 indicating whether a run code will follow, and index flag 812 or 820 indicating whether an index code will follow.

Using these encoding principles, the first code word for AC coefficients of a block is an amplitude code word. The run flag and index flag indicate whether the subsequent code word is another amplitude code word, an index value or a run length code word. If both the run flag and index flag are set, the amplitude code word is followed by an index code word, then a run length code word, which are then followed by another amplitude code word.

An example implementation of a rate controller will now be described in connection with FIG. 10. In this implementation, the rate controller performs a statistics collection pass on the image to determine bit rates for each macroblock in the image for each of a number of scale factors. Each scale factor is a power of two. The distortion corresponding to each scale factor for each macroblock is determined by the square of the scale factor. As noted above, the total distortion over all macroblocks in the image is minimized over the image while meeting a desired bit rate. Thus, the rate controller selects a scale factor for each macroblock to minimize the total distortion over the image while meeting a desired bit rate. The selected scale factor for each macroblock then is used to quantize the frequency coefficients of that macroblock.

Figure 10:
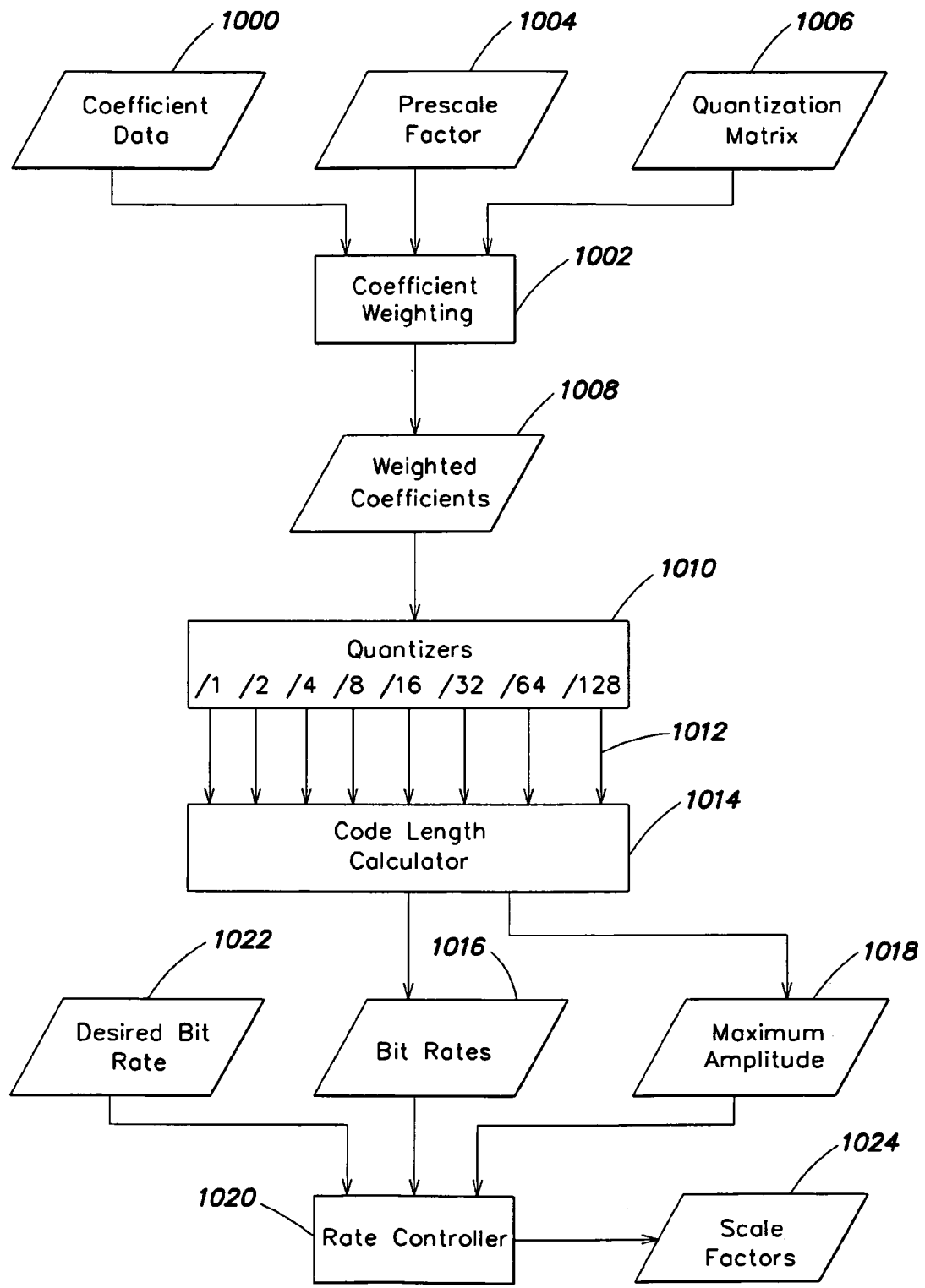
FIG. 10 is a block diagram of an example encoder with rate control.

In particular, in FIG. 10, the coefficients 1000 for each macroblock are weighted using coefficient weighting 1002 by the fixed quantization matrix 10064 and any pre-scale factor 10046. The weighted coefficients 1008 are then quantized by multiple scale factors by quantizers 1010. In a hardware implementation, each quantizer may operate in parallel and may correspond to a scale factor that is a power of two so as to perform only a bit shifting operation. In this example, there are eight such quantizers. As few as two quantizers corresponding to two scale factors could be used, if the rate controller uses interpolation to estimate bit rates corresponding to other scale factors. The resulting quantized values 1012 can be applied to a code length calculator 1014. The code length calculator sums the lengths of the code words that would be generated for the quantized values in each block in each macroblock, to provide a bit rate 1016 for each macroblock for each of the scale factors. The amplitude 1018 of the maximum weighted coefficient, from among the weighted coefficients 1012, also is output. This value 1018 determines the maximum scale factor, which would result in total quantization of the image data. The rate controller 1020 receives the bit rates 1016 for each scale factor for each macroblock in the image, and the maximum weighted macroblock amplitude 1018 for each macroblock in the image, and a desired bit rate 1022 for the image. Using rate-distortion optimization over the image, the rate controller 1020 minimizes the total distortion over all macroblocks in the image to meet the desired bit rate by selecting a scale factor 1022 for each macroblock. The scale factor 1022 for each macroblock is then used to quantize the coefficients for the macroblock, which are then entropy encoded.

Such encoding and decoding may be used for, for example, but not limited to, high definition video, in which images have from 720 to 1080 lines and 1280 to 1920 pixels per line. Frame rates generally vary from 23.976 to 60, with higher frame rates typically representing the field rate of an interlaced frame. Each pixel may be represented using a number of components, for example, but not limited to, luminance and chrominance (Y, Cr, Cb) or red, green and blue, with each component represented using a number of bits (called the bit depth). The bit depth typically is 8 or 10 bits, but could be 12 or 16 bits. Such data has a significantly higher bandwidth than standard definition video. By providing the pre-scale factor as described above, the same encoder may be used to encode both 8-bit and 10-bit data. A fixed quantization matrix may be provided for each of a number of different desired bit rates.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

The invention claimed is:

1. A method for fixed bit rate, intraframe compression of video, including a sequence of images, comprising, for each image:
   segmenting the image into a plurality of portions;
   transforming the portions of the image to generate frequency domain coefficients for each portion;
   selecting, from a plurality of stored quantization matrices each defined for a respective one of a plurality of bit rates, a quantization matrix for the image according to a desired bit rate from the plurality of bit rates for the sequence of images;
   determining a bit rate for each transformed portion of the image using a plurality of scale factors;
   estimating distortion for each portion according to the plurality of scale factors;
   selecting a scale factor for each portion to minimize the total distortion in the image, while achieving a desired bit rate;
   quantizing the frequency domain coefficients for each portion using the selected quantization matrix as scaled by the selected scale factor for the portion;
   entropy encoding the quantized frequency domain coefficients using a variable length encoding to provide compressed data for each of the defined portions; and
   outputting the compressed data for each of the defined portions to provide a compressed bitstream at the desired bit rate.

2. The method of claim 1, wherein the distortion is estimated according to a square of the scale factor.

3. The method of claim 1, wherein each of the plurality of scale factors is a power of two.

4. The method of claim 1, wherein determining a bit rate comprises:
   determining a maximum scale factor that will cause the image data to be completely quantized; and
   interpolating to provide an estimated bit rate for one or more scale factors between the maximum scale factor and a largest scale factor for which a bit rate has been determined.

5. The method of claim 1, wherein:
   the quantization matrix includes a plurality of quantizers;
   each quantizer corresponds to a frequency coefficient; and
   quantizing the frequency coefficients includes quantizing each frequency coefficient using the corresponding quantizer so as to provide a deadzone having a width greater than a value of the quantizer.

* * * * *